(12) United States Patent
Kelly

(10) Patent No.: US 12,272,186 B2
(45) Date of Patent: Apr. 8, 2025

(54) VEHICLE DIAGNOSTICS

(71) Applicant: JAGUAR LAND ROVER LIMITED, Coventry (GB)

(72) Inventor: Jason Kelly, Coventry (GB)

( * ) Notice: Subject to any disclaimer, the term of this patent is extended or adjusted under 35 U.S.C. 154(b) by 0 days.

(21) Appl. No.: 17/909,743

(22) PCT Filed: Mar. 5, 2021

(86) PCT No.: PCT/EP2021/055582
§ 371 (c)(1),
(2) Date: Sep. 6, 2022

(87) PCT Pub. No.: WO2021/176052
PCT Pub. Date: Sep. 10, 2021

(65) Prior Publication Data
US 2023/0131593 A1    Apr. 27, 2023

(30) Foreign Application Priority Data
Mar. 5, 2020   (GB) .................................... 2003209

(51) Int. Cl.
*G07C 5/08*    (2006.01)
*G06F 9/455*   (2018.01)

(52) U.S. Cl.
CPC ....... *G07C 5/0808* (2013.01); *G06F 9/45504* (2013.01); *G07C 2205/02* (2013.01)

(58) Field of Classification Search
CPC .. G07C 5/0808; G07C 2205/02; G07C 5/008; G06F 9/45504; G06F 11/14
See application file for complete search history.

(56) References Cited

U.S. PATENT DOCUMENTS

| 2014/0006555 A1 | 1/2014 | Shields |
| 2018/0173515 A1 | 6/2018 | Goltz et al. |
| 2018/0281598 A1* | 10/2018 | Shu ................. G05B 19/042 |

FOREIGN PATENT DOCUMENTS

KR    20110015951 A    2/2011

OTHER PUBLICATIONS

Combined Search and Examination report corresponding to Great Britain Application No. GB2003209.0, Nov. 12, 2020, 10 pages.
International Search Report and Written Opinion corresponding to International Application No. PCT/EP2021/055582, dated May 10, 2021, 12 pages.

(Continued)

*Primary Examiner* — Calvin Cheung
(74) *Attorney, Agent, or Firm* — Reising Ethington P.C.

(57) ABSTRACT

Aspects of the present invention relate to a vehicle controller comprising at least two virtual machines being hosted on the vehicle controller. The vehicle controller comprises an input for receiving a diagnostic command from a diagnostic tool. Furthermore, the controller comprises a first virtual machine hosted on the vehicle controller comprising a diagnostic module and a second virtual machine hosted on the vehicle controller comprising a vehicle service comprising diagnostic data. The diagnostic module is configured to initiate a diagnostic function on the vehicle service upon receipt of a diagnostic command at the input. The controller further comprises an output configured to output a diagnostic signal indicative of a result of the diagnostic function to the diagnostic tool.

18 Claims, 9 Drawing Sheets

(56) References Cited

OTHER PUBLICATIONS

Examination Report corresponding to Great Britain Application No. GB2003209.0, dated Jul. 21, 2022, 3 pages.
European Office Action corresponding to application 21 709 022.4, dated Feb. 20, 2025, 6 pages.

* cited by examiner

VEHICLE DIAGNOSTICS

TECHNICAL FIELD

The present disclosure relates to vehicle diagnostics. Aspects of the invention relate to a vehicle controller and to a vehicle.

BACKGROUND

It is known to run remote vehicle diagnostics using DoIP (Diagnostics over Internet Protocol) in accordance with the ISO 13400 standard. DoIP enables communication between an external tester and a control system, for example an electronic control unit (ECU), on the vehicle. The external tester may use a remote diagnostic tool to connect to a vehicle and to run diagnostics on, and get information from, the required ECUs on the vehicle to perform a diagnostic function.

Traditionally, ECU's have one DoIP stack per ECU. However, this approach is inefficient as there is significant duplication in code as a result of the multiple DoIP stacks across the various control systems within the vehicle. Furthermore, when a diagnostic request is received from a remote tester data may be required from multiple ECUs across the vehicle which requires the remote tester to communicate with multiple DoIP stacks which increases the overall complexity and time for the diagnostic request to be carried out.

This problem is compounded in modern vehicles that are becoming increasingly connected and require more ECUs to control each of the electrical systems or subsystems in a vehicle. The ever-increasing number of ECU's presents a challenge in terms of performing diagnostic procedures as each ECU requires its own DoIP stack which further adds to the complexity of the process.

Traditionally each ECU is hosted on a separate processor within the vehicle. However, there is a move within the industry to host multiple ECU's as virtual machines on a controller. As such, multiple DoIP stacks may be running on the same processor which is inefficient and represents a duplication of code. As such there is a need to provide an improved remote diagnostic service for modern vehicles that have a large number of ECUs.

It is an aim of the present invention to address one or more of the disadvantages associated with the prior art.

SUMMARY OF THE INVENTION

Aspects and embodiments of the invention provide a vehicle controller and a vehicle as claimed in the appended claims According to an aspect of the present invention there is provided a vehicle controller comprising at least two virtual machines being hosted on the vehicle controller, the vehicle controller comprising: an input for receiving a diagnostic command from a diagnostic tool; a first virtual machine hosted on the vehicle controller comprising a diagnostic module; a second virtual machine hosted on the vehicle controller comprising a vehicle service comprising diagnostic data; wherein the diagnostic module is configured to initiate a diagnostic function on the vehicle service upon receipt of a diagnostic command at the input; and an output configured to output a diagnostic signal indicative of a result of the diagnostic function to the diagnostic tool.

Beneficially the diagnostic module provides a single point of communication between the diagnostic tool and the vehicle services hosted on the multiple virtual machines within the control system. As such, the diagnostic tool may send a diagnostic command to the diagnostic module and the diagnostic module may then determine which vehicle services to target in response to the received diagnostic command. Furthermore, the diagnostic module allows a diagnostic tool to connect to a single point of the control system and for the diagnostic tool to perform diagnostic functions across multiple virtual machines within the vehicle controller.

The diagnostic command may be a command to initiate a diagnostic function, for example to perform a diagnostic routine on one or more vehicle services or request diagnostic data from one or more vehicle services. The diagnostic data may relate to, for example, a data identifier (DID), a diagnostic trouble code (DTC) or a result of a diagnostic routine performed on a vehicle service.

The vehicle controller may be a control system comprising one or more controllers, for example electronic control units (ECUs). The one or more controllers may collectively comprise at least one electronic processor having an electrical input for receiving the diagnostic command and at least one memory device electronically coupled to the at least one electronic processor and having instructions stored therein. The at least one electronic processor may be configured to access the at least one memory device and execute the instructions thereon so as to initiate a diagnostic function on the vehicle service upon receipt of a diagnostic command at the input.

In an embodiment the first virtual machine may comprise a diagnostic database configured to store diagnostic data received from the vehicle service. In another embodiment the diagnostic module may be configured to receive the diagnostic data from the vehicle service and to send it to the diagnostic database. The diagnostic database may comprise diagnostic data received from one or more of the vehicle services. Furthermore, the diagnostic database may comprise validation parameters used to validate a diagnostic command received from the diagnostic tool.

In one embodiment the diagnostic module may be configured to retrieve diagnostic data from the diagnostic database in response to the received diagnostic command. The diagnostic signal may be indicative of diagnostic data retrieved from the diagnostic database. For example, the diagnostic signal may be indicative of a data identifier (DID) or a diagnostic trouble code (DTC) stored in the diagnostic database.

In another embodiment the diagnostic module may be configured to request diagnostic data from the vehicle service in response to the received diagnostic command. The received diagnostic command may be a request for diagnostic data.

In an embodiment the diagnostic database may comprise validation parameters and the diagnostic module may be configured to validate the diagnostic command upon receipt of a diagnostic command at the input. The diagnostic module may be configured to retrieve the validation parameters from the diagnostic database when the diagnostic module is validating the diagnostic command. The diagnostic module may compare the retrieved validation parameters with a diagnostic parameter indicative of the received diagnostic command to validate the received diagnostic command.

In another embodiment the diagnostic module may be configured to perform a vehicle diagnostic procedure in response to receiving the diagnostic command wherein the vehicle diagnostic procedure comprises at least one diagnostic function or routine. The diagnostic procedure may comprise one or more of: a diagnostic routine or function, a request for diagnostic data and a software download. Beneficially, the diagnostic module may manage the multiple diagnostic functions within the diagnostic procedure.

In one embodiment the vehicle controller may comprise a further input configured to receive diagnostic data from a vehicle CAN bus. The diagnostic module may be configured to receive diagnostic data from the vehicle CAN bus. This is beneficial as the diagnostic module may receive diagnostic data from vehicle services outside of the vehicle controller.

In another embodiment the controller may comprise a third virtual machine comprising a further vehicle service and wherein the diagnostic module is configured to initiate the diagnostic function on the further vehicle service. In an embodiment the diagnostic module may be configured to request diagnostic data from, or initiate a diagnostic function on, the further vehicle service. The diagnostic module beneficially may perform a diagnostic procedure comprising diagnostic functions on multiple virtual machines simultaneously.

In an embodiment the diagnostic signal may be indicative of a result of the diagnostic function initiated on the vehicle service hosted on the second virtual machine and the further vehicle service hosted on the third virtual machine. The diagnostic signal may comprise diagnostic data from one or more vehicle services.

In another embodiment the diagnostic module may comprise a DoIP stack configured to communicate with the diagnostic tool. In one embodiment the diagnostic module may comprise an input configured to receive the diagnostic command.

In an embodiment the diagnostic data may comprise at least one of: a data identifier and a diagnostic trouble code.

According to a further aspect of the present invention there is provided a vehicle comprising a vehicle controller as described in any one of the aforementioned aspects or embodiments.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In general terms embodiments of the invention relate to a system for performing diagnostics on a vehicle controller within a vehicle. The vehicle controller comprises two or more virtual machines hosted on the vehicle controller and an input for receiving an input signal, such as a diagnostic command, from a diagnostic tool. A first virtual machine hosted on the vehicle controller comprises a diagnostic module and a second virtual machine hosted on the vehicle controller comprises one or more vehicle services or applications. The diagnostic module is configured to receive a diagnostic command from the diagnostic tool and to perform a diagnostic command or function on the vehicle service on the second virtual machine.

The diagnostic module is configured to communicate with other vehicle services hosted on the virtual machines within the vehicle controller such that the vehicle services may raise information to the diagnostic module and such that the diagnostic module may perform diagnostic functions on the vehicle services. For example, the diagnostic module may perform a diagnostic function, such as run a diagnostic routine on the vehicle service. The diagnostic module may further comprise a diagnostic database to store the data parameters raised to the diagnostic module or results of diagnostic functions.

This is beneficial as the diagnostic module or stack may perform diagnostic functions on the vehicle services hosted across one or more virtual machines within the controller. Thereby negating the need to have a diagnostic module or stack dedicated to each virtual machine on the controller.

Figure 1:
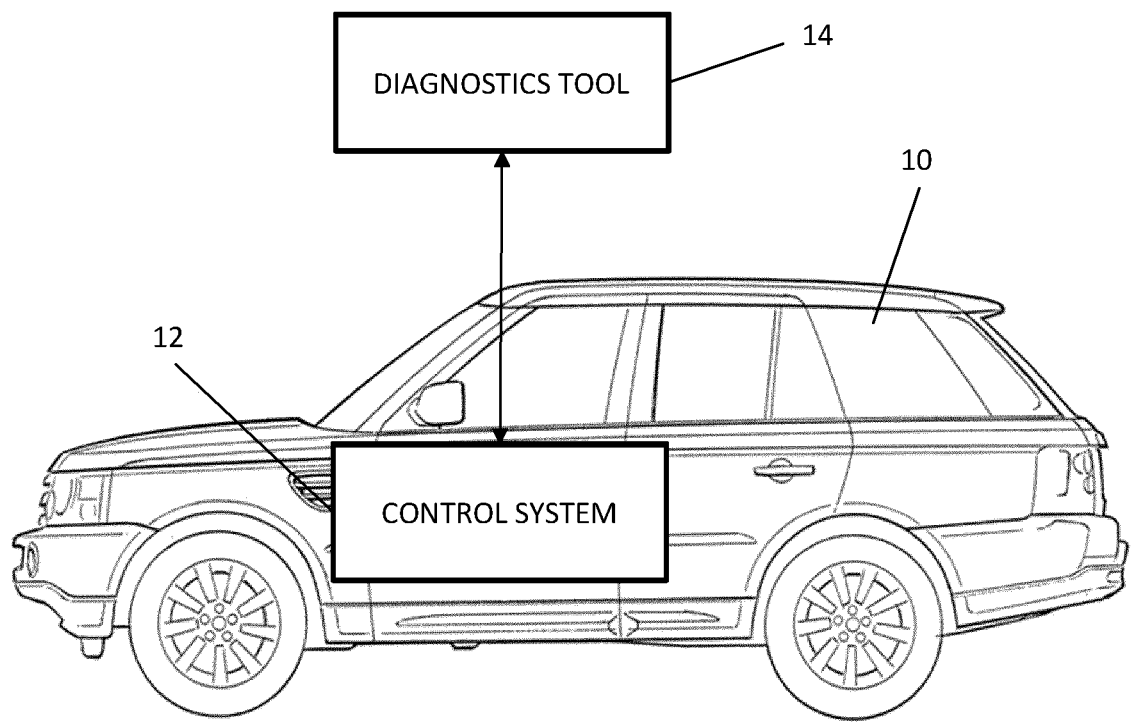
FIG. 1 shows a vehicle comprising a control system connected to a diagnostic tool in accordance with an embodiment of the invention.

To place embodiments of the invention in a suitable context reference will firstly be made to FIG. 1 which shows a vehicle 10 comprising a control system 12. A diagnostic tool 14 is connected to the control system 12 such that the diagnostic tool 14 may perform diagnostics on the vehicle 10. The diagnostic tool 14 may be connected to the vehicle 10 wirelessly such that the tool 14 can perform remote diagnostics on the vehicle 10. Alternatively, the diagnostic tool 14 may be connected to the vehicle 10 by a mechanic in a garage through a wired connection, for example, via an On-Board Diagnostics, OBD, port within the vehicle 10.

Figure 2:
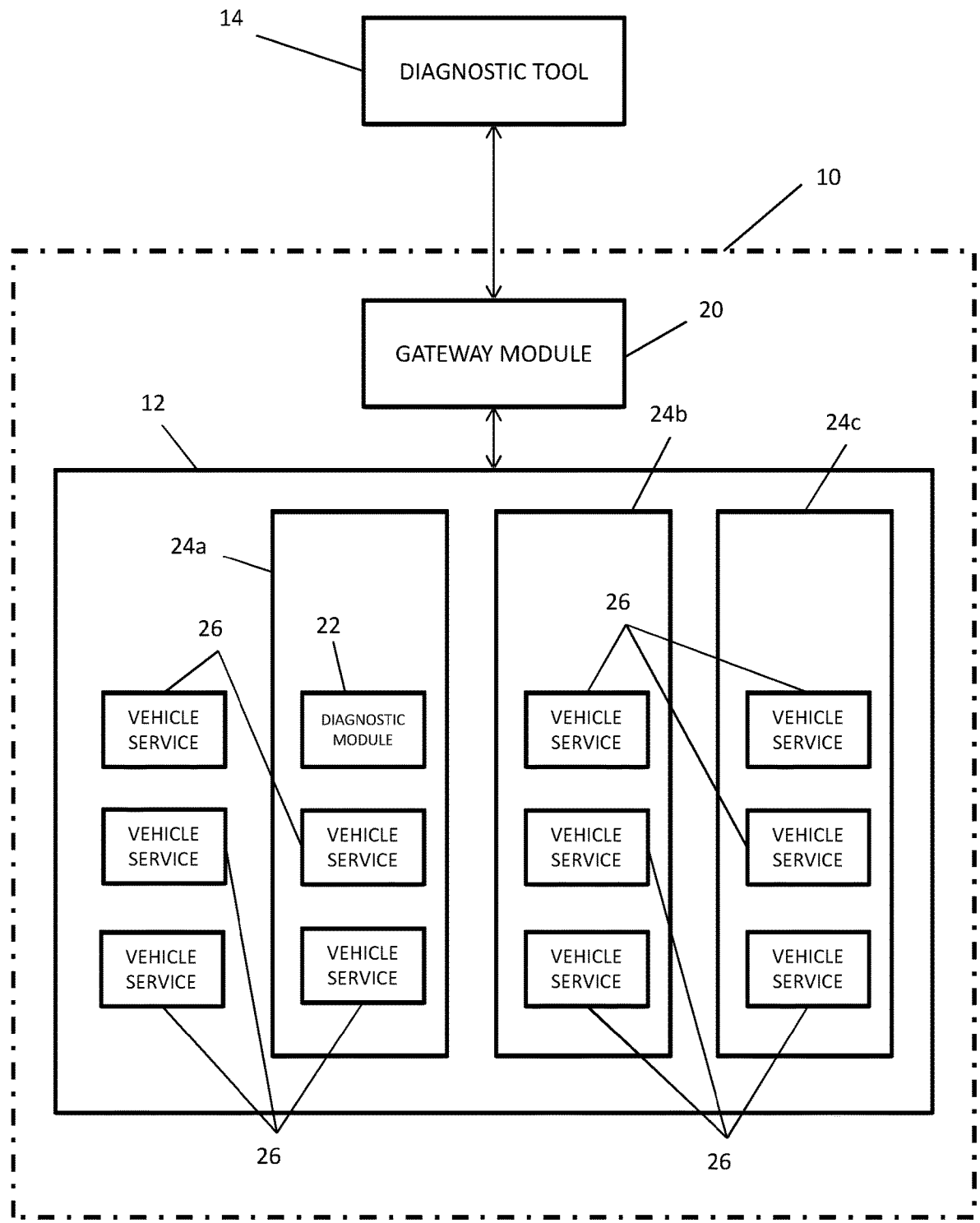
FIG. 2 shows a schematic view of the control system comprising a diagnostic module and three virtual machines and being connected to the diagnostic tool.

Turning now to FIG. 2, the control system 12 is shown schematically in further detail. The control system 12 comprises three virtual machines 24a, 24b, 24c being hosted on the vehicle controller 12. The virtual machines 24a, 24b, 24c each host vehicle services 26 or vehicle applications configured to perform functions on the vehicle 10. Each vehicle service 26 comprises diagnostic data indicative of the status and performance of each respective vehicle service 26. For example, the diagnostic data may be a diagnostic trouble code (DTC), a data identifier (DID) or any other diagnostic data indicative of the status and performance of the vehicle service 26.

As shown in FIG. 2, the first virtual machine 24a comprises a diagnostic module 22 and two vehicle services 26. The diagnostic module 22 is configured to receive a diagnostic command from the diagnostic tool 14 and to initiate a diagnostic function on the required vehicle services 26 on one or more of the virtual machines 24a, 24b, 24c being hosted on the controller 12. The vehicle 10 further comprises a gateway module 20 configured to communicate with both the diagnostic tool 14 and the diagnostic module 22.

The diagnostic tool 14 is configured to connect to the diagnostic module 22 hosted on the first virtual machine 24a such that the diagnostic tool 14 can send a diagnostic command to or request diagnostic data from the diagnostic module 22. Upon receipt of a diagnostic command from the diagnostic tool 14 the diagnostic module 22 is configured to determine the vehicle services 26 that the received diagnostic command relates to. The diagnostic module 22 manages received diagnostic commands or requests from the diagnostic tool 14 and distributes the commands or requests to the necessary vehicle services 26 within the controller 12. The diagnostic module 22 may manage multiple diagnostic commands and requests across various vehicle services 26 simultaneously.

Furthermore, the diagnostic module 22 comprises an output to send a diagnostic signal indicative of results of diagnostic functions and/or diagnostic data to the diagnostic tool 14. The output may send a diagnostic signal to the diagnostic tool 14 that is indicative of a result of a diagnostic command or of diagnostic data raised by one or more of the vehicle services 26 such that the results may be viewed by a tester.

Figure 3:
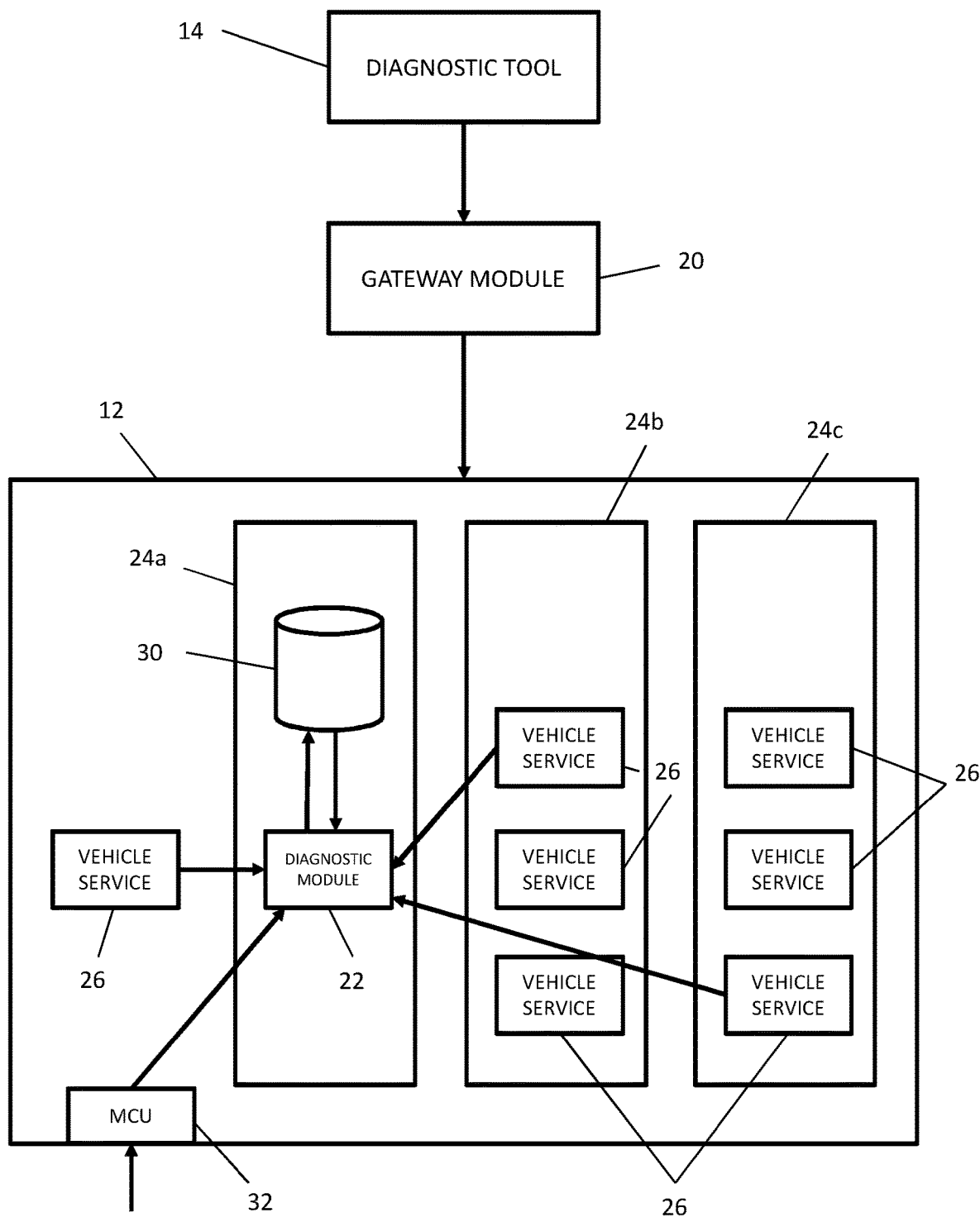
FIG. 3 shows another schematic view of the control system of FIG. 2 comprising a diagnostic database.

As shown in FIG. 3, the vehicle services 26 hosted on each virtual machine 24a, 24b, 24c are configured to communicate with the diagnostic module 22 hosted on the first virtual machine 24a such that diagnostic data may be raised to the diagnostic module 22. Upon receipt of a diagnostic command, in particular a request for diagnostic data, from the diagnostic tool 14 the diagnostic module 22 is configured to validate the received command and to target the vehicle services 26 associated with the received command to perform a diagnostic function. The diagnostic function may be, for example, a request for diagnostic data or initiating a diagnostic routine on the vehicle service 26.

FIG. 3 shows a schematic representation of the control system 12 upon receipt of a diagnostic command from the diagnostic tool 14 wherein the diagnostic command is a request for diagnostic data from one or more vehicle services 26. Every vehicle service 26 within the control system 12 is configured to raise diagnostic data to the diagnostic module 22 in response to a request for diagnostic data from the diagnostic tool 14. The diagnostic data may be, for example, a data identifier (DID) or a diagnostic trouble code (DTC). The skilled reader will understand that the diagnostic data may be other parameters required to perform a diagnostic function on a vehicle controller 12.

Upon receipt of a diagnostic command from the diagnostic tool 14 in which the diagnostic tool 14 requests diagnostic data the diagnostic module 22 may determine the vehicle services 26 that the request relates to. The diagnostic module 22 is configured to determine the vehicle services 26 that the request for diagnostic data relates to and then sends a request for diagnostic data to the required vehicle services 26. The vehicle services 26 then raise the requested diagnostic data to the diagnostic module 22. This is beneficial as the diagnostic tool 14 does not need to know where the diagnostic data is stored on the vehicle 10 or to which vehicle services 26 the request relates.

A diagnostic database 30 may be hosted on the first virtual machine 24a in communication with the diagnostic module 22. The diagnostic database 30 is configured to read and write diagnostic data raised by the vehicle services 26 to the diagnostic module 22. This is beneficial as the diagnostic data may be stored in a central location that is readable by the diagnostic module 22. This is particularly advantageous if the request for diagnostic data relates to a vehicle service 26 located on a virtual machine 24b, 24c, other than the virtual machine 24a hosting the diagnostic module 22, that has been powered down. In this situation the diagnostic module 22 may retrieve diagnostic data from the diagnostic database 30 that has been raised previously by the vehicle service 26. Thereby removing the need for all the virtual machines 24a, 24b, 24c to be powered ON when performing diagnostic functions and furthermore removing the need to power a virtual machine 24a, 24b, 24c ON upon receipt of a diagnostic command.

The control system 12 further comprises a microprocessor control unit (MCU) 32 configured to raise diagnostic data from the CAN traffic of the vehicle 10 to the diagnostic module 22. The diagnostic data transmitted to the diagnostic module 22 from the MCU 32 is stored in the diagnostic database 30 such that the diagnostic tool 14 can read the diagnostic data. This is beneficial as the diagnostic module 22 may receive diagnostic data from other control systems within the vehicle 10.

Figure 4:
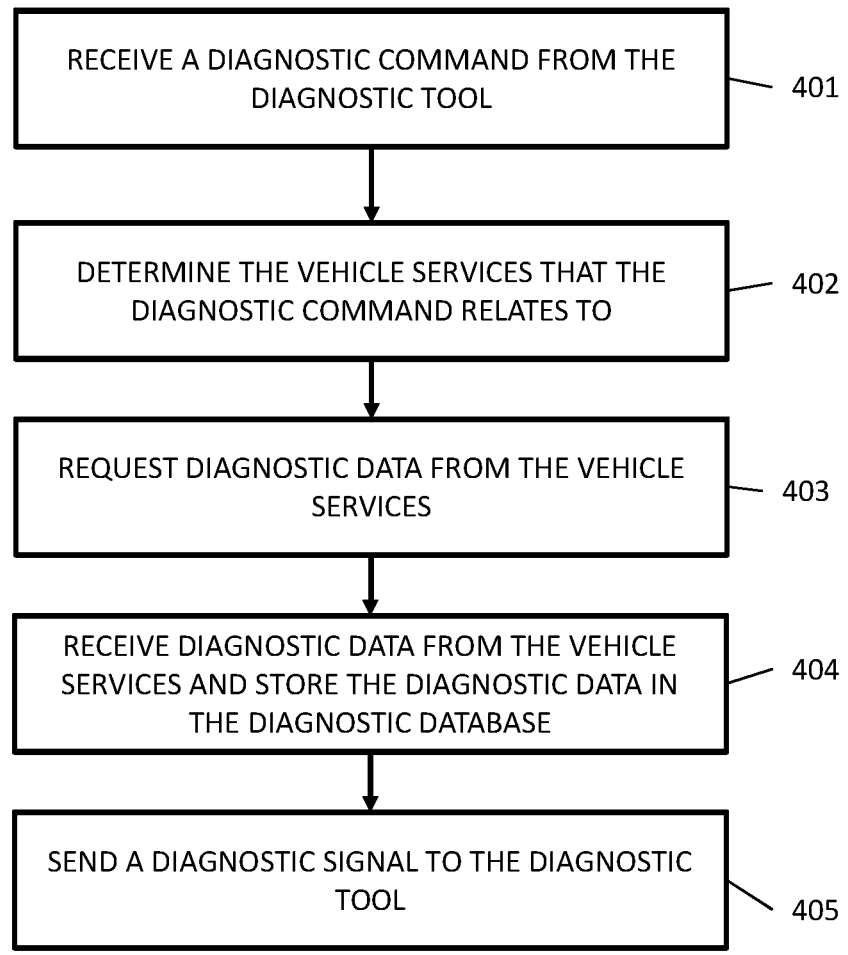
FIG. 4 shows a flow chart outlining a method of requesting diagnostic data from a vehicle service in the control system of FIG. 3.

FIG. 4 shows a method of requesting diagnostic data from one or more vehicle services 26 within the controller 12 as being performed by the controller 12 in FIG. 3. In Step 401 the diagnostic module 22 receives a diagnostic command from the diagnostic tool 14 wherein the diagnostic command relates to a request for diagnostic data from one or more vehicle services 26. Upon receipt of the diagnostic command the diagnostic module 22 determines which vehicle services 26 the diagnostic command relates to in Step 402. In Step 403 the diagnostic module 22 requests diagnostic data from the one or more vehicle services 26 that the diagnostic command relates to. Next, in Step 404, the diagnostic module 22 receives the diagnostic data from the one or more vehicle services 26 and stores the diagnostic data in the diagnostic database 30. In Step 405, the diagnostic module 22 sends a diagnostic signal indicative of the requested diagnostic data to the diagnostic tool 14.

Figure 5:
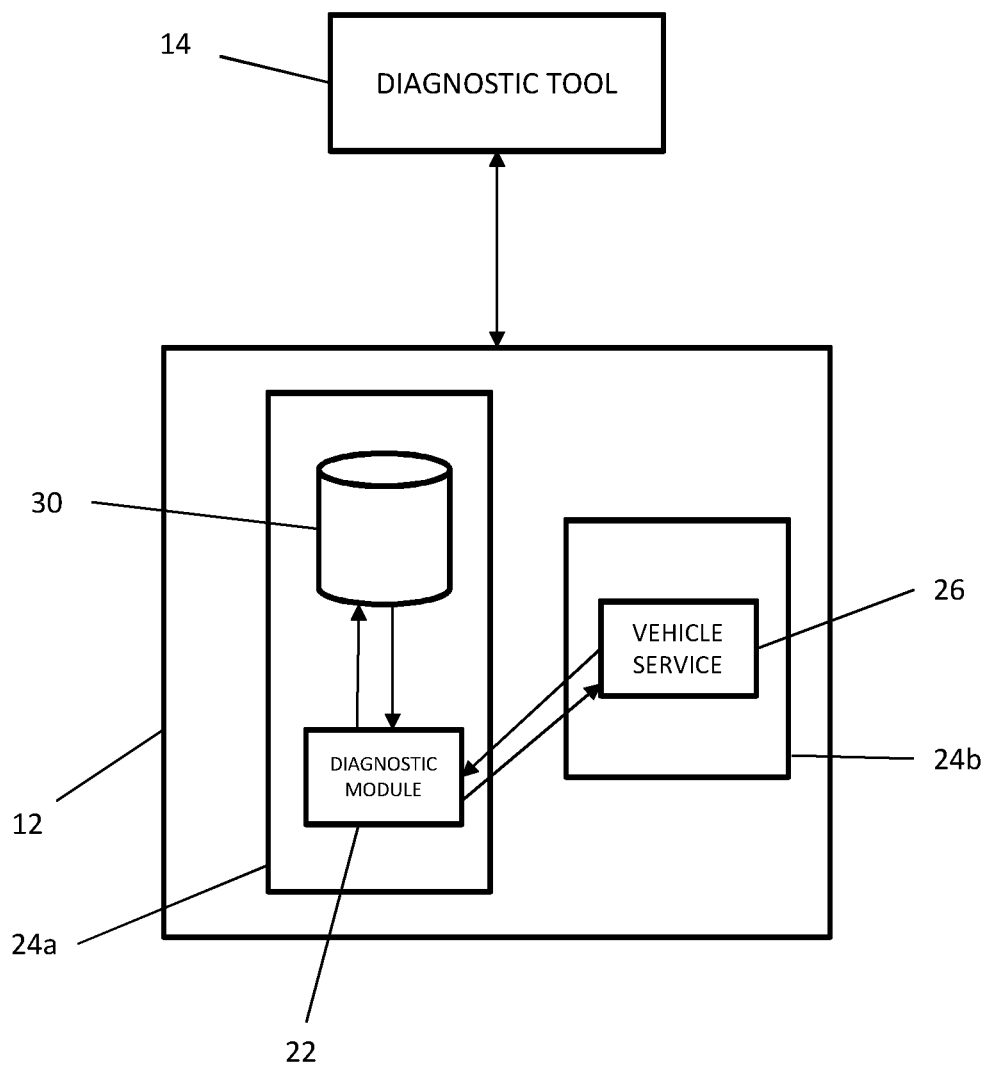
FIG. 5 shows a schematic view of the diagnostic module performing a diagnostic function on a vehicle service.

The diagnostic tool 14 is also configured to send diagnostic commands to the diagnostic module 22 to initiate diagnostic functions, for example, to run diagnostic routines on one or more vehicle services 26 on the vehicle 10. FIG. 5 shows an example of the diagnostic module 22 initiating a diagnostic function on the vehicle service 26 and then receiving the results of the diagnostic function from the vehicle service 26. The diagnostic module 22 acts as the central controller for managing diagnostic commands received from the diagnostic tool 14. The diagnostic command received from the diagnostic tool 14 may be a request to start a diagnostic function, to stop a diagnostic function or to request the results of a diagnostic function.

Upon receipt of a diagnostic command from the diagnostic tool 14, the diagnostic module 22 is configured to validate the request. The request may be validated by requesting validation parameters from the diagnostic database 30 and comparing the validation parameters with diagnostic parameters indicative of the received diagnostic command.

If the received diagnostic command is validated by the diagnostic module 22 the diagnostic module 22 is configured to initiate the diagnostic function or routine on the required vehicle service 26. The diagnostic module 22 is further configured to receive the results of the diagnostic function and to transmit the results of the function to the diagnostic tool 14 such that the tester using the diagnostic tool 14 may view the results of the diagnostic function.

Whilst the example shown in FIG. 5 shows the diagnostic module 22 performing a diagnostic function on one vehicle service 26, the diagnostic module 22 is configured to handle multiple diagnostic functions or routines simultaneously. This is beneficial as the diagnostic module 22 may handle diagnostics for the vehicle 10 across multiple vehicle services 26, virtual machines 24a, 24b, 24c and multiple vehicle controllers 12. The diagnostic module 22 comprises a single DoIP (diagnostic over IP) stack that is capable of handling all of the incoming diagnostic requests from the diagnostic tool 14 thereby negating the requirement to have dedicated diagnostic module 22 for each virtual machine 24a, 24b, 24c and controller 12 within the vehicle 10.

Figure 6:
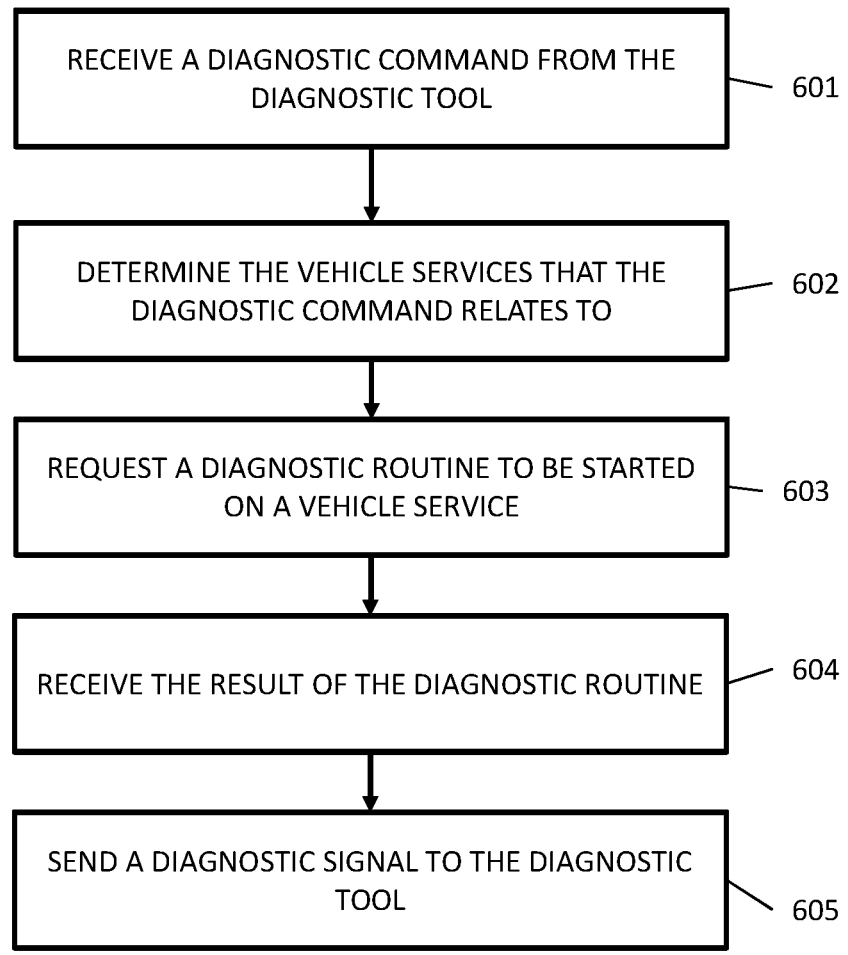
FIG. 6 shows a flow chart outlining a method of performing a diagnostic routine on a vehicle service in the control system of FIG. 5.

FIG. 6 shows a method of performing a diagnostic routine on one or more vehicle services 26 within the controller 12 as being performed by the controller 12 illustrated in FIG. 5. In Step 601 the diagnostic module 22 receives a diagnostic command from the diagnostic tool 14 wherein the diagnostic command relates to a diagnostic routine to be performed on one or more vehicle services 26. In Step 602, the diagnostic module 22 is configured to determine the vehicle services 26 that the diagnostic command relates to. The diagnostic module 22 may further validate the received diagnostic command prior to initiating the diagnostic routine.

Next, in Step 603, the diagnostic module 22 is configured to request that the diagnostic routine is started on the one or more vehicle services 26. The diagnostic module 22 may start a routine, pause a routine or request results from the diagnostic routine. In Step 604, the diagnostic module receives the results of the diagnostic routine and in Step 605 the diagnostic module sends a diagnostic signal to the diagnostic tool 14 indicative of the results of the diagnostic routine.

Figure 7:
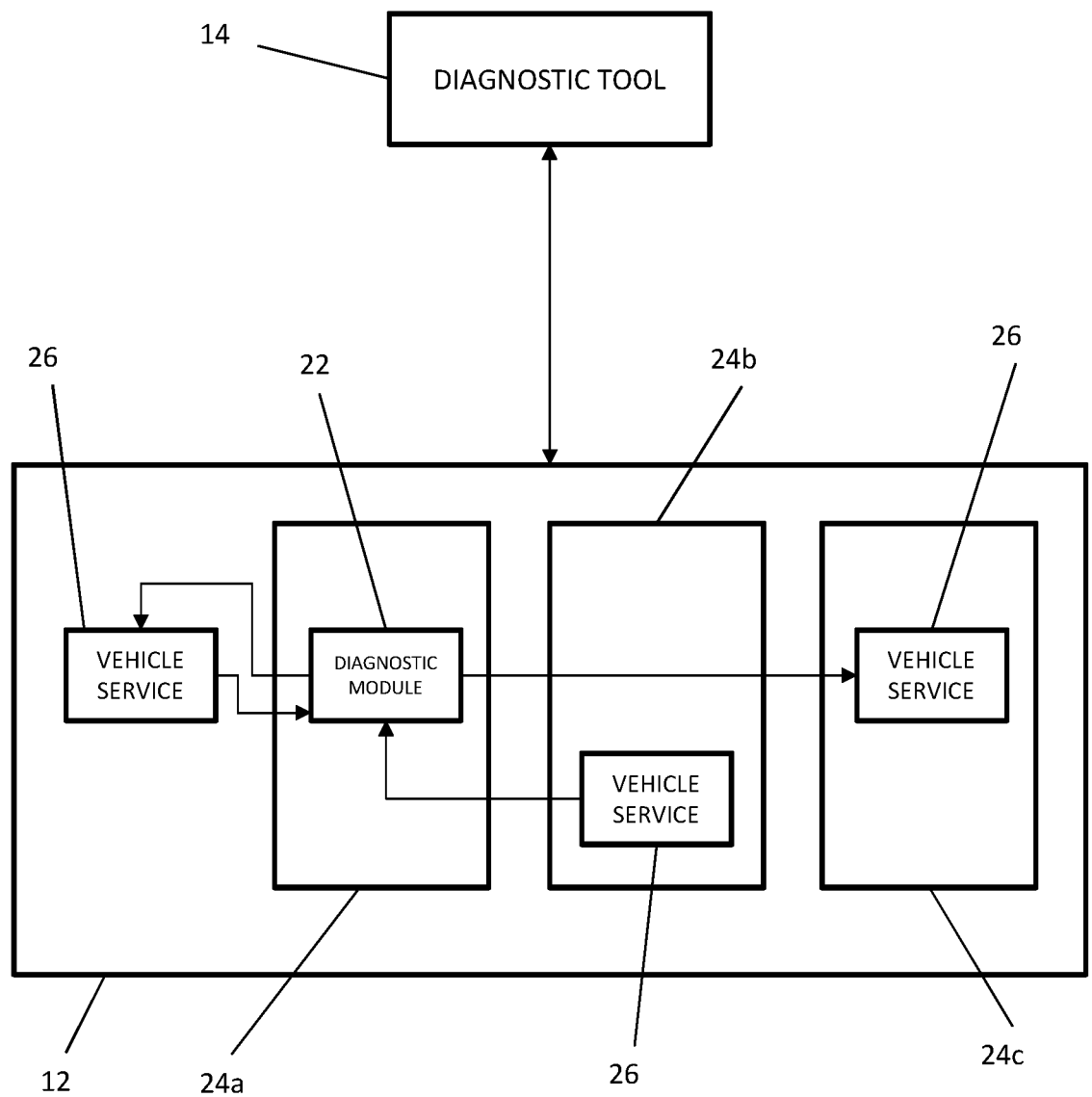
FIG. 7 shows a schematic view of the diagnostic module performing multiple diagnostic functions simultaneously.

FIG. 7 shows an example where the diagnostic tool 14 has requested three different diagnostic commands to be performed in parallel. For example, a first command may relate to running a diagnostic function or routine on a vehicle service 26, a second command may request diagnostic data, such as a DID and the third command may relate to a software download. Upon receipt of each command the diagnostic module 22 is configured to receive each diagnostic command, validate each command and then direct the received command to the required vehicle service 26 or services.

In the example shown in FIG. 7, the diagnostic tool 14 may connect to the diagnostic module 22 and send the diagnostic commands to the diagnostic module 22 without the need or requirement to know which vehicle services 26, or indeed where the vehicle services 26 are hosted, to perform the diagnostic command. This is beneficial as it provides a central diagnostic module 22 that can validate received diagnostic command and then target specific vehicle services 26 as required with the diagnostic command.

Figure 8:
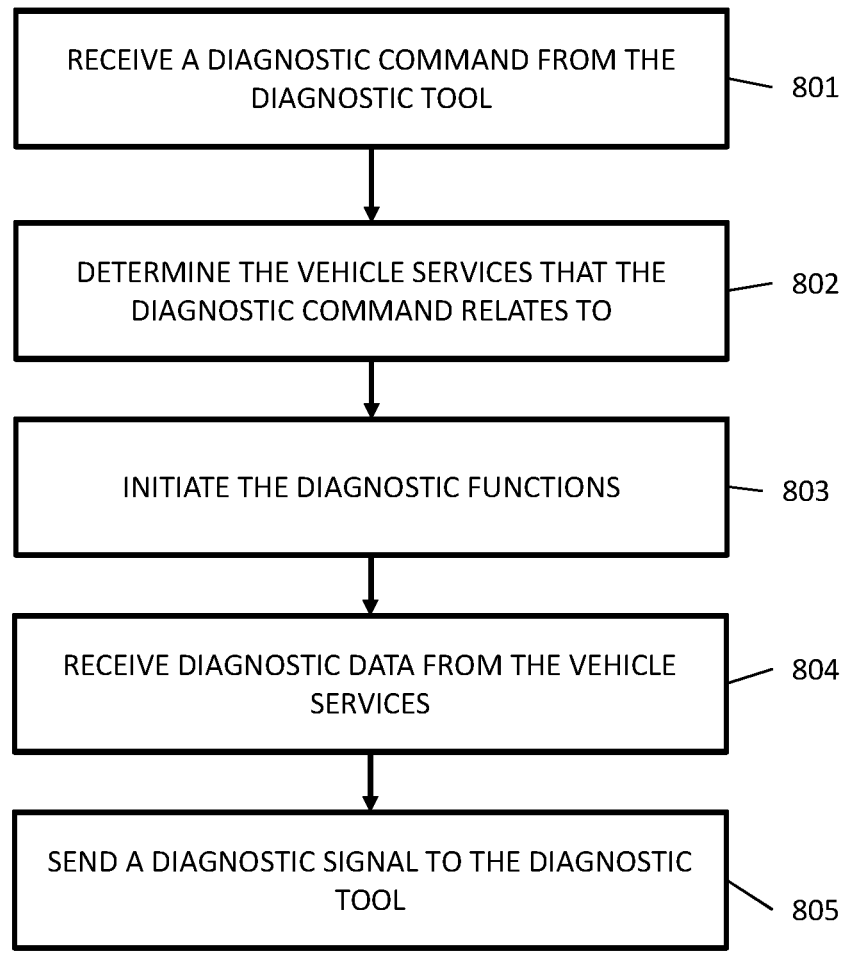
FIG. 8 shows a flow chart outlining a method of initiating multiple diagnostic functions on vehicle services in the control system of FIG. 7.

FIG. 8 shows a method of performing multiple diagnostic functions simultaneously as being performed by the vehicle controller 12 illustrated in FIG. 7. In Step 801 the diagnostic module 22 receives a diagnostic command from the diagnostic tool 14. The diagnostic command may be a command to perform multiple diagnostic functions on the vehicle controller 12. For example, the diagnostic command may comprise a request for diagnostic data, a diagnostic routine to be performed and a software download for a vehicle service 26. In Step 802 the diagnostic module 22 determines the vehicle services 26 that the diagnostic functions relate to. In Step 803 the diagnostic module 22 initiates the diagnostic functions on the vehicle services 26 determined to relate to each diagnostic function.

In Step 804 the diagnostic module 22 receives diagnostic data from the vehicle services 26. The diagnostic data may relate to, for example, a DID, a DTC, a result of a diagnostic routine or a result of the software download. In Step 805, the diagnostic module 22 sends a diagnostic signal to the diagnostic tool 14.

Figure 9:
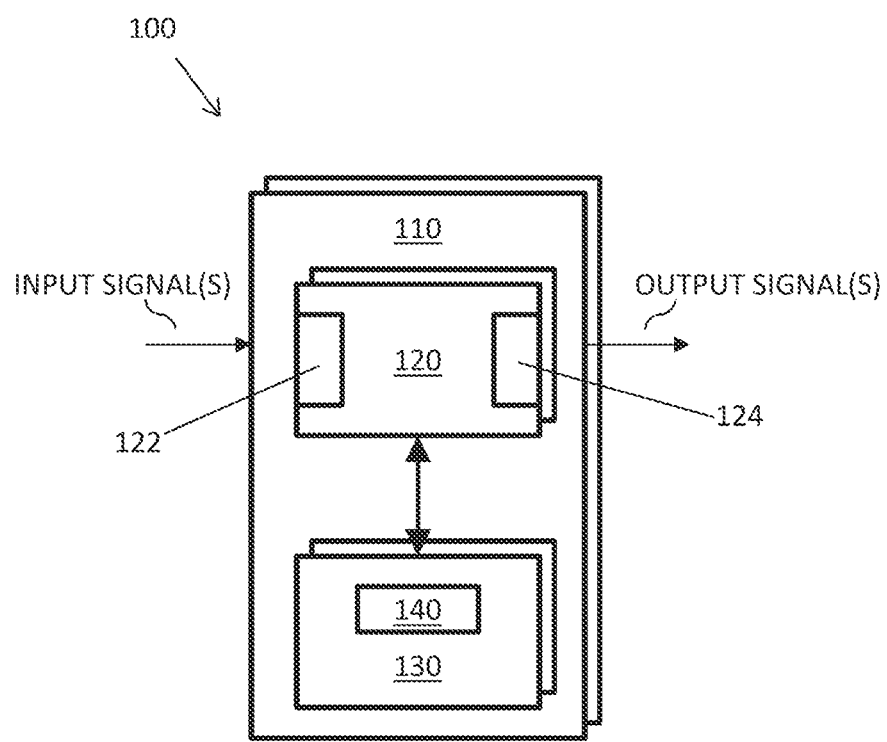
FIG. 9 shows a simplified example of a control system suitable for use with embodiments of the invention.

With reference to FIG. 9, there is illustrated a simplified example of a control system for use with embodiments of the invention. The control system 100 comprises one or more controllers 110 and is configured to run a diagnostic routine or function on the vehicle service upon receipt of a diagnostic command at the input.

It is to be understood that the or each controller 110 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 110 may be embodied in, or hosted in, different control units or computational devices. The or each controller 110 may host one or more virtual machines. As used herein, the term "controller," "control unit" or "computational device" will be understood to include a single controller, control unit, or computational device, and a plurality of controllers, control units, or computational devices collectively operating to provide the required control functionality. A set of instructions could be provided which, when executed, cause the controller 110 to implement the control techniques described herein (including some or all of the functionality required for the method described herein). The set of instructions could be embedded in said one or more electronic processors of the controller 110; or alternatively, the set of instructions could be provided as software to be executed in the controller 110. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 9, the or each controller 110 comprises at least one electronic processor 120 having one or more electrical input(s) 122 for receiving one or more input signals and one or more electrical output(s) 124 for outputting one or more output signals. The or each controller 110 further comprises at least one memory device 130 electrically coupled to the at least one electronic processor 120 and having instructions 140 stored therein. The at least one electronic processor 120 is configured to access the at least one memory device 130 and execute the instructions 140 thereon so as to initiate a diagnostic function on the vehicle service upon receipt of a diagnostic command at the input.

The, or each, electronic processor 120 may comprise any suitable electronic processor (e.g., a microprocessor, a microcontroller, an ASIC, etc.) that is configured to execute electronic instructions. The, or each, electronic memory device 130 may comprise any suitable memory device and may store a variety of data, information, threshold value(s), lookup tables or other data structures, and/or instructions therein or thereon. In an embodiment, the memory device 130 has information and instructions for software, firmware, programs, algorithms, scripts, applications, etc. stored therein or thereon that may govern all or part of the methodology described herein. The processor, or each, electronic processor 120 may access the memory device 130 and execute and/or use that or those instructions and information to carry out or perform some or all of the functionality and methodology describe herein.

The at least one memory device 130 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 110 have been described comprising at least one electronic processor 120 configured to execute electronic instructions stored within at least one memory device 130, which when executed causes the electronic processor(s) 120 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

We claim:

1. A vehicle controller comprising at least two virtual machines being hosted on the vehicle controller, the vehicle controller comprising:
   an input for receiving a diagnostic command from a diagnostic tool;
   a first virtual machine of the at least two virtual machines hosted on the vehicle controller comprising a diagnostic module;
   a second virtual machine of the at least two virtual machines hosted on the vehicle controller comprising a vehicle service comprising diagnostic data;
   wherein the diagnostic module is configured to initiate a diagnostic function on the vehicle service upon receipt of a diagnostic command at the input; and
   an output configured to output a diagnostic signal indicative of a result of the diagnostic function to the diagnostic tool.

2. A vehicle controller as claimed in claim 1, wherein the first virtual machine comprises a diagnostic database configured to store diagnostic data from the vehicle service.

3. A vehicle controller as claimed in claim 2, wherein the diagnostic module is configured to receive the diagnostic data from the vehicle service and to send it to the diagnostic database.

4. A vehicle controller as claimed in claim 2, wherein the diagnostic module is configured to retrieve diagnostic data from the diagnostic database in response to the received diagnostic command.

5. A vehicle controller as claimed in claim 4, wherein the diagnostic signal is indicative of diagnostic data retrieved from the diagnostic database.

6. A vehicle controller as claimed in claim 2, wherein the diagnostic database comprises validation parameters and wherein the diagnostic module is configured to validate the diagnostic command upon receipt of a diagnostic command at the input.

7. A vehicle controller as claimed in claim 6, wherein the diagnostic module is configured to retrieve the validation parameters from the diagnostic database when the diagnostic module is validating the diagnostic command.

8. A vehicle controller as claimed in claim 1, wherein the diagnostic module is configured to request diagnostic data from the vehicle service in response to the received diagnostic command.

9. A vehicle controller as claimed in claim 1, wherein the diagnostic module is configured to perform a vehicle diagnostic procedure in response to receiving the diagnostic command wherein the vehicle diagnostic procedure comprises at least one diagnostic function.

10. A vehicle controller as claimed in claim 1, wherein the vehicle controller comprises a further input configured to receive diagnostic data from a vehicle CAN bus.

11. A vehicle controller as claimed in claim 10, wherein the diagnostic module is configured to receive diagnostic data from the vehicle CAN bus.

12. A vehicle controller as claimed in claim 1, wherein the controller comprises a third virtual machine comprising a further vehicle service and wherein the diagnostic module is configured to initiate the diagnostic function on the further vehicle service.

13. A vehicle controller as claimed in claim 12, wherein the diagnostic module is configured to request diagnostic data from the further vehicle service.

14. A vehicle controller as claimed in claim 12, wherein the diagnostic signal is indicative of a result of the diagnostic function run on the vehicle service hosted on the second virtual machine and the further vehicle service hosted on the third virtual machine.

15. A vehicle controller as claimed in claim 1, wherein the diagnostic module comprises a DoIP stack configured to communicate with the diagnostic tool.

16. A vehicle controller as claimed in claim 1, wherein the diagnostic module comprises an input configured to receive the diagnostic command.

17. A vehicle controller as claimed in claim 1, wherein the diagnostic data comprises at least one of: a data identifier and a diagnostic trouble code.

18. A vehicle comprising a vehicle controller, wherein the vehicle controller comprises at least two virtual machines being hosted on the vehicle controller, the vehicle controller comprising:
   an input for receiving a diagnostic command from a diagnostic tool;
   a first virtual machine of the at least two virtual machines hosted on the vehicle controller comprising a diagnostic module;
   a second virtual machine of the at least two virtual machines hosted on the vehicle controller comprising a vehicle service comprising diagnostic data;

wherein the diagnostic module is configured to initiate a diagnostic function on the vehicle service upon receipt of a diagnostic command at the input; and an output configured to output a diagnostic signal indicative of a result of the diagnostic function to the diagnostic tool.

* * * * *